Figure 5:
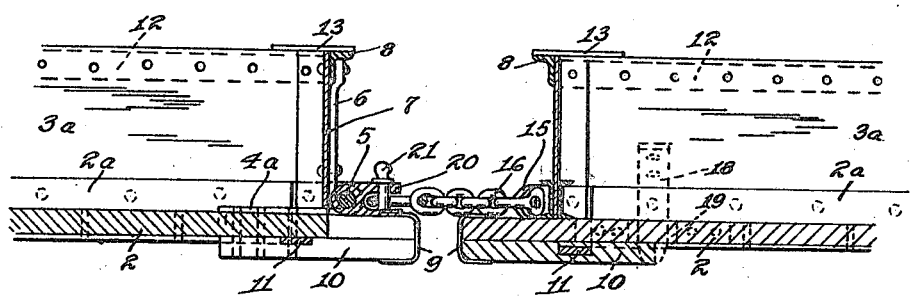

P. W. HOLSTEIN.
CAR UNLOADING APPARATUS.
APPLICATION FILED JUNE 13, 1919.
1,412,869.
Patented Apr. 18, 1922.
3 SHEETS—SHEET 1.
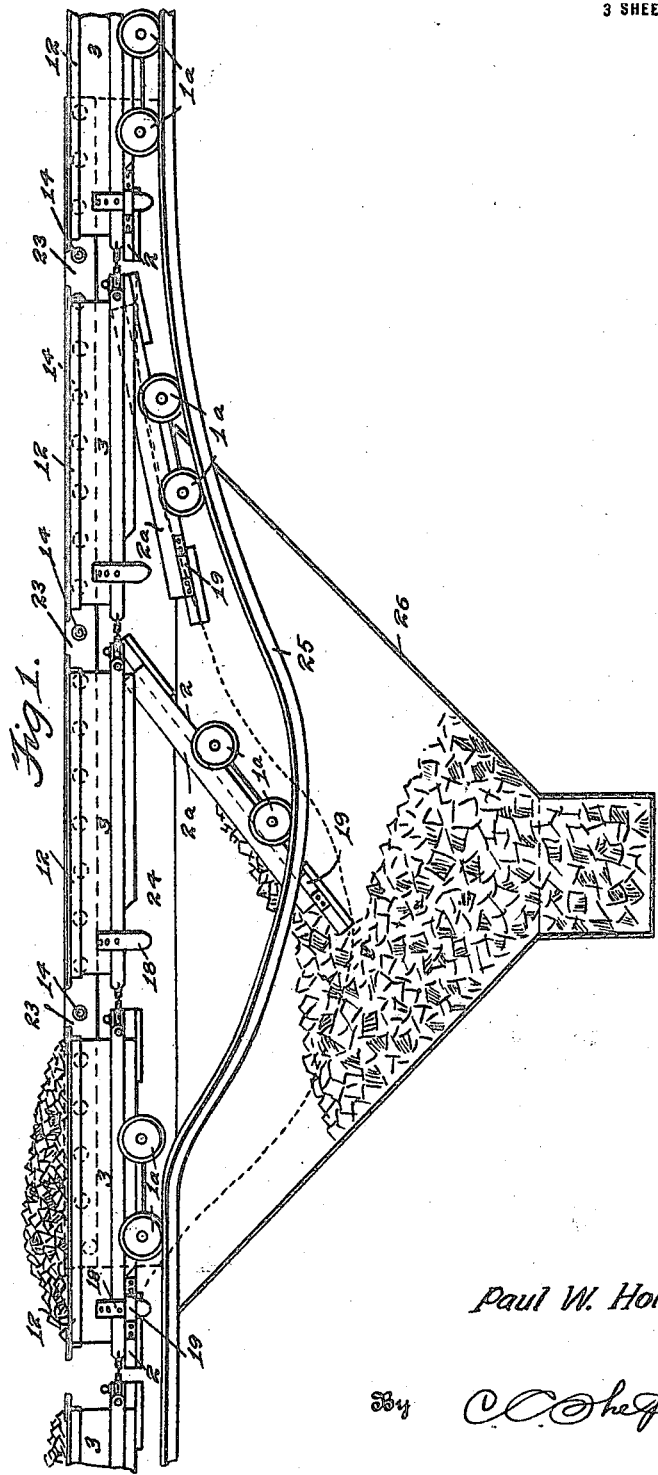
Inventor
Paul W. Holstein
By C. C. Shepherd
Attorney P. W. HOLSTEIN.
CAR UNLOADING APPARATUS.
APPLICATION FILED JUNE 13, 1919.
1,412,869.
Patented Apr. 18, 1922.
3 SHEETS—SHEET 2.
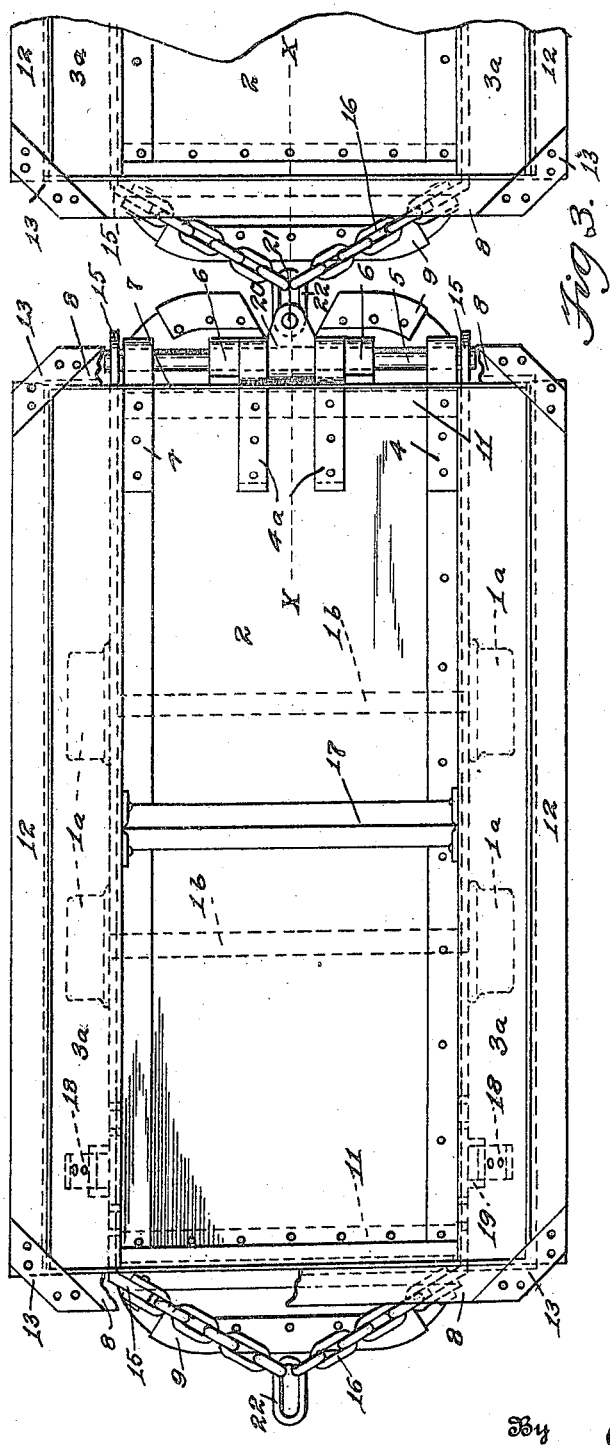
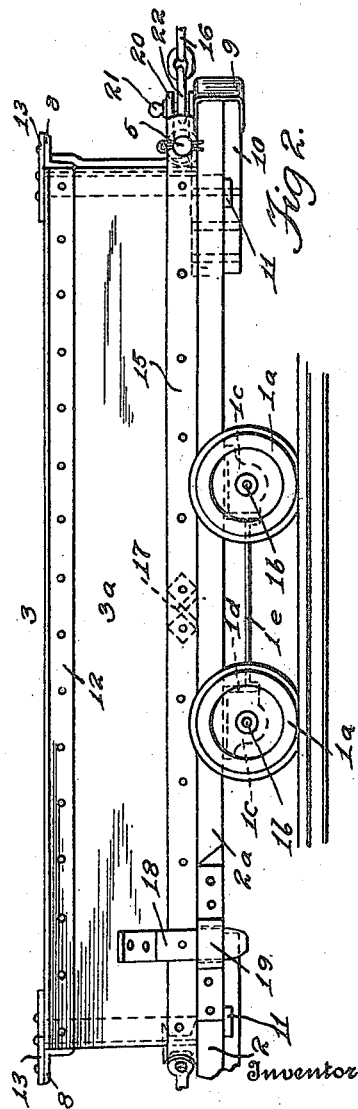
Inventor
Paul W. Holstein
By C. C. Shepherd
Attorney Inventor
Paul W. Holstein

UNITED STATES PATENT OFFICE.

PAUL W. HOLSTEIN, OF COLUMBUS, OHIO.

CAR-UNLOADING APPARATUS.

1,412,869. Specification of Letters Patent. Patented Apr. 18, 1922.

Application filed June 13, 1919. Serial No. 303,938.

*To all whom it may concern:*

Be it known that PAUL W. HOLSTEIN, a citizen of the United States, residing at Columbus, in the county of Franklin and State of Ohio, has invented certain new and useful Improvements in Car-Unloading Apparatus, of which the following is a specification.

This invention relates to improvements in car unloading apparatus, and the primary object of the invention resides in the provision of a load carrying car having a pivoted bottom upon which transporting wheels are mounted, and to provide a trackway in combination with said car which is provided with a depressed portion, whereby when the car proper travels over said depressed portion, said bottom will be caused to assume an open position in order that the contents of the car may be discharged, means of a permanent character being employed in conjunction with the depressed portion of said trackway to retain the wall structure of said car in a supported position, and on the main plane of the trackway, during the period of travel of said car over the depressed portion of said trackway.

A further object of the invention is to provide a car structure wherein the transport wheels are attached to the car bottom and to connect the wall structure of said car in pivotal relation with said bottom so that the same may be normally supported thereon, and by means of this structure to secure simplicity in operation, together with rigidity of construction and absolute safety from premature dumping during transportation. In former devices, the car walls and transport wheels acted as a supporting structure for the pivoted bottom, which was hinged to the walls beneath the wheel axles, and held up by latching or locking devices, which were automatically tripped as the car passed over the unloading point. In this previous structure, commonly known as the Ord dump car, the main track rail extended across the mouth of a load receiving hopper, and an auxiliary track was provided which dipped down over the hopper and on which, during dumping period, ran the small wheels attached to the car bottom. These wheels served to gage the opening between the bottom and the wall structure and supported said bottom when the latter assumed an unloading position, and also acted to return the bottom to a closed and latched position for the next loading operation.

The present invention aims to essentially improve this prior structure by eliminating the latching or locking devices and provides a correlation of elements which serves to render the action of the apparatus forming the subject matter of the present invention positive and reliable, and wherein the car bottom is only capable of assuming an unlocked position when the car proper is situated above an appropriate unloading point.

A still further object of the invention resides in the provision of a guide or chute-like structure between the walls of the car body and the pivoted bottom thereof, said structure serving to guide said bottom during its opening and closing movements and to insure proper registry between parts.

Other objects and improvements will appear and be described hereinafter.

Figure 4:
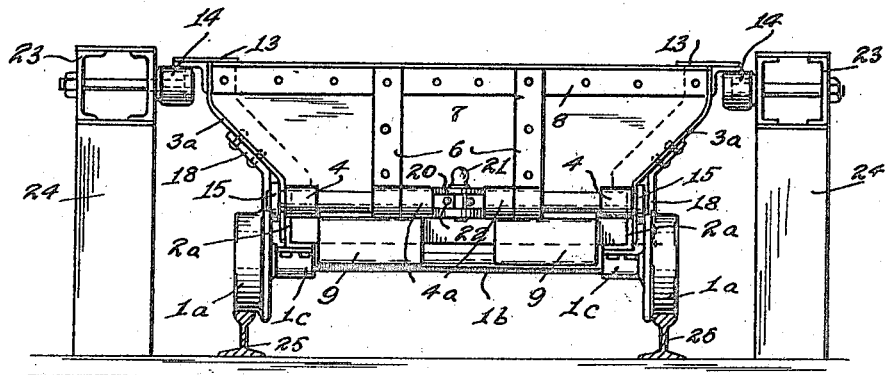

In the drawings:

Figure 1 is a side elevation of the car unloading apparatus comprising the present invention, Figure 2 is an enlarged side elevation of the dump car employed in the apparatus and showing the pivotal connection between the bottom of the car body and the load retaining walls thereof, Figure 3 is a plan view of said car and disclosing the draft connections between said car and an adjoining car, the end walls of one of the car bodies being broken away to disclose underlying structure, Figure 4 is an end elevation and disclosing more particularly the stationary runway for supporting the walls of said car body during the discharge period, and Figure 5 is a longitudinal sectional view of the adjoining portions of two cars, the plane of the section being indicated by the line $x$—$x$ of Figure 3.

Referring more particularly to the structural details of my improved car unloading apparatus, I employ a plurality of dumping cars, in each of which the transport wheel truck is unitarily designated by the numeral 1. This truck is preferably of the usual four wheel type employed in connection with mine or other types of dumping cars.

The transport wheels $1^a$ are, as shown, of relatively small diameter and are mounted on axles $1^b$, the latter being suitably journaled in bearing boxes $1^c$, which are secured to the truck frame angle bars $1^d$, and these angle bars are suitably attached to the car bottom sills $2^a$. A pair of braces $1^e$ have their bent ends secured, as by riveting, to the angle bars $1^d$, and serve to stiffen the truck frame and preserve the alignment of the wheels $1^a$. The truck frame angle bars $1^d$ and the braces $1^e$ also reinforce and cross-brace the bottom sills $2^a$ and thus prevent twist or sag in the car bottom 2. These sills $2^a$ are, as shown in Figures 4 and 5, preferably of angle bar steel of unequal lengths, with the vertical leg being of greater depth than the width of the horizontal leg and of considerable strength to prevent flexing in longitudinal directions of the bottom. This construction also results in the bottom 2, when open, being of a chute like shape so that the car contents are directed and maintained in proper path of discharge. The sills $2^a$ are preferably pivoted or hinged to the wall structure 3 of the car body by means of strap hinges 4, which are riveted or otherwise rigidly secured to the sills $2^a$, and at the outer ends encircle a pivot shaft 5 which is mounted across the lower front end of the car by means of strap brackets 6, the latter being riveted to the front wall 7 of the wall structure 3 and serve as braces therefor. At their upper ends the brackets 6 are attached to an angle bar 8, which extends transversely across the upper portion of the wall 7. The bottom 2 is preferably built of heavy timbers and extends beyond the ends of the wall structure 3, and is provided with steel plate bumpers 9 mounted thereon at each end.

The timbers 10 reinforce the bumpers 9 and the bottom 2 and, moreover, there are cross sills 11 which further act to stiffen the bottom 2. The wall structure 3 is of sheet steel, and its outer sides $3^a$ are hopper shaped, embraced by means of the angle bars 8 at each end thereof, and also, by the bars 12 riveted along their upper edges. Corner braces 13 serve to reinforce these frame bars 12 and the latter serve during the discharge period to support the wall structure 3 by means of anti-friction runway rollers 14, the mounting of which will be hereinafter set forth. The numeral 15 indicates the lower or draft frame of the car body and to which the sides $3^a$ are riveted. This frame member at its forward end encircles the pivot shaft 5 and at its rear end a draft chain 16 is pinned or otherwise secured thereto. The wall structure is laterally braced to hold its shape by means of an angle cross bar 17 placed midway of the length thereof. Stakes or pins 18 are riveted to the sides $3^a$ and to the frame 15 and their upper ends serve to brace the sides $3^a$, while their lower ends which project below the wall structure engage stake pockets 19 for the purpose of assisting properly to reassemble and cause to register the wall structure 3 and the bottom 2 by firmly reuniting these elements after the discharge of the car contents and during the loading and transportation period. The pockets 19 are secured to the sills $2^a$ of the bottom 2. A coupling clevis 20, pivoted on the pivot shaft 5 by means of a pin 21, engages a link 22, which link is connected to the draft chain 16, thus facilitating the coupling of two adjacent cars.

The bottom sills $2^a$ at no time fully disengage from the frame 15 of the wall structure 3, the upper leg of the sill always having a portion intermeshing therewith, and by this means, and by reason of the assembly of the stakes 18 in the stake pockets 19, together with the pivotal connection beween the car bottom and said wall structure, the bottom is always brought into its proper registration with the wall structure. The large size and ample strength of the hinges 4 and $4^a$ and of the pivot shaft 5 consist in maintaining the two car elements in proper working positions at all times. The rollers 14 are carried by runways 23, which may be of any suitable type of construction. These runways are mounted preferably on concrete bases 24 and are provided with studs upon the inner ends of which are rotatably journaled the anti-friction rollers 14, which latter are so positioned as to receive the outward flange of the bars 12 and thus serve to directly support and to effect the transfer thereover of the wall structure 3 during the dumping operation. The runways 23 engage the wall structure just in advance of the beginning of the unloading operation and continue to support and convey the wall structure until the depressed portion 25 of the main trackway over which the cars operate again returns the bottom 2 to normal supporting and loading positions. It will be observed that the unloading curve, shown in dotted lines in Figure 1 is a very gradual and easy one, the car contents thus being assured of very gentle unloading so as to prevent breaking up of coal or other frangible material while being delivered into a hopper 26 or other suitable receptacle positioned beneath the depressed portion 25 of the trackway.

In view of the foregoing description, it will be apparent to those versed in the art that the apparatus comprising the present invention is particularly adaptable in its utilitarian accomplishment of quickly and positively effecting the discharge of material from cars or other suitable carriers. The arrangement is such as to permit a train of cars to be rapidly drawn across a discharge point and to have the contents of said cars fully and completely discharged without stopping the train to empty each individual car. The construction thus tends to eliminate the use of car tilting or other similar discharging apparatus now in general service and to effect a considerable increase in production of mine tipples. Furthermore, through the provision of the mechanism described all latches or locking devices between the car bottom and the associated wall structures are eliminated thus tending to eliminate premature discharging of the car contents by accidental operations of the trip or latch mechanisms thereof. The car itself is exceptionally staunch in construction, and is fully capable of withstanding load stresses without subjecting its parts to distorting strains or bending pressures. The rollers 14 are located in longitudinally spaced relationship and are so positioned that a plurality of the same will be constantly in engagement with the members 12 during the passage of the wall structure of said cars across the runways.

What I claim is:

1. In a car unloading apparatus, a car comprising a bottom mounted on transport wheels, a wall structure normally supported on said bottom in a loadable position, a pivotal connection between said car bottom and said wall structure, a railway track over which said car operates, a depressed section formed as a continuation of said track whereby said car bottom is caused to assume an unloading position and to return to a normal loadable position after said car passes thereover, and means independent of said car track whereby the wall structure of said car is supported during the unloading operation.

2. In a car unloading apparatus, a car comprising a body composed of a car bottom mounted on transport wheels and a wall structure normally positioned on said bottom and transported thereby, means operating to permit of relative separation between said bottom and wall structure during the discharge of the contents of said car, and means other than said car bottom to transportably support said wall structure during the discharge period.

3. In a car unloading apparatus, a car comprising a body composed of a bottom mounted on transport wheels and a wall structure normally positioned on said bottom, a pivotal connection between said bottom and said wall structure to permit of the discharge of the car contents, a main track for said car having a depressed portion formed therein constructed to allow said pivotal connection to effect the discharge of the car contents and the return of said bottom and said wall structure to normal loadable positions, and means to convey and support said wall structure during the discharge period, said wall structure being disposed to convey and partially support said car bottom during the period of discharge.

4. In a car unloading apparatus, a car comprising a body formed to include a load retaining wall structure and a car bottom, car wheels connected with said bottom, a car track having a depressed portion, a pivotal connection between said wall structure and said bottom to effect unloading of the car contents during the passage of said car over the depressed portion of said track, means independent of said track to sustain said wall structure in transportable positions during the unloading operation, and said car bottom being conveyed and partially supported by its pivotal connection with said wall structure and also partially supported by the car wheels on said track during the unloading operation.

5. In a card unloading apparatus, a track section to permit unloading of a discharge car, a discharge car movable over said section having a bottom and associated load retaining walls, said car being adapted to automatically unload its contents while passing over said track section, a runway disposed on opposite sides of said track sections and serving to transport the wall structure of said car during the unloading operation whereby said wall structure is sustained on substantially the same horizontal plane with other connecting cars.

6. In a car unloading apparatus, a discharge car composed of a car bottom having transport wheels connected therewith, load retaining walls pivotally connected to and normally supported on said car bottom, said bottom and said walls having intermeshing portions at their pivotal ends which at all times engage each other to secure proper reunion or replacement of said walls on said car bottom subsequent to the discharge operation.

7. In a car unloading apparatus, a car track section adapted to cause automatic unloading of a discharge car, a discharge car composed essentially of two members, one member forming the car bottom and being supported on transport wheels, the other member forming the load retaining wall structure and being normally supported on said car bottom, means to permit unloading of said car in connection with said track section, and means to secure said car bottom and said wall structure in normal loadable relationship before and after the discharge period.

8. In a car unloading apparatus, a track section adapted to cause automatic unloading of a discharge car, a discharge car composed essentially of two members, one member forming the car bottom and being suitably supported on transport wheels, the other member forming load retaining walls and being normally supported on said bottom member, means connecting said two car members to permit discharge of the car contents in co-operation with said track section, and a runway at each side of said car wall structure to support the latter in operative train position during the discharge period.

9. In a car unloading apparatus, a car including load retaining walls, a wheeled car bottom, a pivotal connection between said walls and bottom for permitting of the discharge of the car contents, and means acting subsequently to the discharge of the contents for securely reuniting said walls and bottom in loadable relationship, comprising a chute like construction of said bottom which facilitates unloading and acts scissors like in the process of reunity to assure proper registration between said walls and bottom.

In testimony whereof I affix my signature.

PAUL W. HOLSTEIN.